(No Model.)

J. C. COVERT.
BULL LEAD.

No. 326,899. Patented Sept. 22, 1885.

ATTEST.
Joseph Seeberger
James P. Fallon

INVENTOR.
James C. Covert
PER. H. Lisle Fleming,
ATT'Y

UNITED STATES PATENT OFFICE.

JAMES C. COVERT, OF WEST TROY, NEW YORK.

BULL-LEAD.

SPECIFICATION forming part of Letters Patent No. 326,899, dated September 22, 1885.

Application filed May 8, 1884. (No model.)

*To all whom it may concern:*

Be it known that I, JAMES C. COVERT, a citizen of the United States, residing at West Troy, in the county of Albany and State of New York, have invented a new and useful Improvement in Bull-Leads, of which the following is a specification.

This invention relates to that class of implements used for catching and holding cattle or horses; and it consists in the combination of a snap-hook arranged so as to be operated by a cord or chain with a handle, as hereinafter more fully described, my object being to provide a device by means of which said animals may be more readily captured and controlled.

Figure 2:
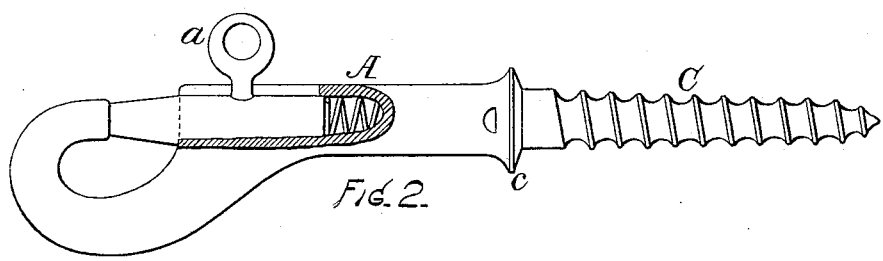
Figure 1:
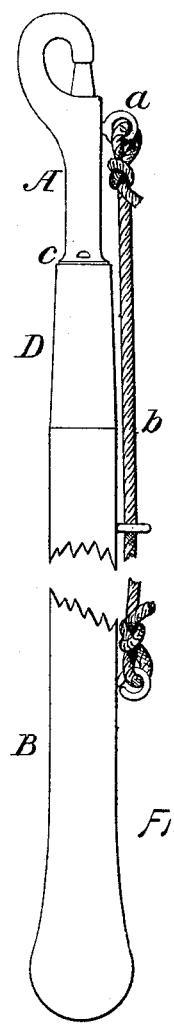

In the drawings, Figure 1 is a general view of my improved device with the handle partly broken away; and Fig. 2 is an enlarged view of the snap portion detached, part being broken away.

Similar letters of reference in each indicate corresponding parts.

A represents the snap, having a hook at forward end and a tubular body to receive a longitudinally-sliding bolt and spring, said bolt being provided with the outwardly-projecting ring or loop $a$, connected therewith by a short shank or neck, a suitable slot being formed to permit retraction of same, in which respects, excepting the ring substituted in this device for the usual thumb-piece or knob, it is similar in the construction and operation to snap-hooks otherwise employed, and previously patented by me.

By B is represented the handle, along which, when the snap is attached thereto by the screw-extension C or other suitable means, the cord or chain $b$ may be extended, with one end secured to said ring $a$, similar rings being provided on handle to guide and retain the same thereon. The base or rear end of snap may be formed with suitable projection or projections, C, to retain the ferrule D upon forward end of handle after the same have been connected, as aforesaid.

The operation of my improved device is as follows: By grasping the handle at butt and withdrawing the bolt by pulling back the cord the snap may be hooked into the nose-ring of cattle, or into a ring or some other convenient part of a halter upon a horse, so that the animal dealt with may be held firmly and at a proper distance, the communication with the operative parts of snap afforded by the cord, and the accessibility of same on account of its position upon handle, greatly facilitating the opening or closing of bolt, as required, either in capturing or releasing the said animal.

By using the screw-extension formed integrally with snap-body, as shown in Fig. 2, the cost of manufacture is considerably reduced, and a firmer and more reliable connection with handle is provided, in which respects it is a great advantage over all other modes of attachment; and the advantage of the ring $a$ over the usual thumb-piece or knob is that the cord or chain may be more securely fastened thereto, and the possibility of becoming accidentally detached thereby avoided.

I do not claim, broadly, in catching and holding tools, a pole or handle for mounting and guiding the operative parts; neither do I claim the exclusive use of a cord or chain for communicating therewith, as I am fully aware that such expedients are common. I also make no additional claim upon the construction and operation of snap-hook in such respects as similar to those previously patented by me, as hereinbefore stated; but What I do claim, and desire to secure by Letters Patent, is—

1. As an improved bull-lead or tool for catching and holding animals, a device consisting of a snap-hook having a longitudinally-sliding spring-bolt with an outwardly-projecting ring or loop thereon, a pole or handle to the forward end of which said snap-hook is secured, and a cord or chain one end of which is fastened to the ring on the bolt, and which is extended along the handle and retained thereon by rings placed at intervals upon the same, substantially as shown and described, for the objects herein set forth.

2. As an improved article of manufacture, for the purpose described, a snap-hook having, in combination with a shouldered screw-extended body, a ring or loop in attachment with and projecting from a longitudinally-sliding spring-bolt, substantially as specified.

JAMES C. COVERT.

Witnesses:
H. LISLE FLEMING,
A. W. RICHARDSON.